(12) United States Patent
Kudo et al.

(10) Patent No.: US 10,638,341 B2
(45) Date of Patent: Apr. 28, 2020

(54) WIRELESS ENVIRONMENT INFORMATION COLLECTION SYSTEM AND METHOD

(71) Applicant: NIPPON TELEGRAPH AND TELEPHONE CORPORATION, Tokyo (JP)

(72) Inventors: Riichi Kudo, Yokosuka (JP); Hirantha Sithira Abeysekera, Yokosuka (JP); Munehiro Matsui, Yokosuka (JP); Takeo Ichikawa, Yokosuka (JP); Masato Mizoguchi, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 175 days.

(21) Appl. No.: 15/744,215

(22) PCT Filed: Aug. 1, 2016

(86) PCT No.: PCT/JP2016/072541
§ 371 (c)(1),
(2) Date: Jan. 12, 2018

(87) PCT Pub. No.: WO2017/022723
PCT Pub. Date: Feb. 9, 2017

(65) Prior Publication Data
US 2018/0206134 A1     Jul. 19, 2018

(30) Foreign Application Priority Data
Aug. 4, 2015   (JP) .................................. 2015-154479

(51) Int. Cl.
*H04W 24/08*     (2009.01)
*H04W 24/00*     (2009.01)
(Continued)

(52) U.S. Cl.
CPC ............ *H04W 24/08* (2013.01); *H04W 16/14* (2013.01); *H04W 24/00* (2013.01); *H04W 24/02* (2013.01);
(Continued)

(58) Field of Classification Search
None
See application file for complete search history.

(56) References Cited

U.S. PATENT DOCUMENTS 8,724,650 B2 * 5/2014 Denteneer ......... H04W 74/0816
370/447
2011/0269406 A1   11/2011 Aminaka et al.
(Continued)

FOREIGN PATENT DOCUMENTS

| | | |
|---|---|---|
| EP | 2696530 A2 | 2/2014 |
| JP | 2009-55297 A | 3/2009 |

(Continued)

OTHER PUBLICATIONS

Office Action regarding Korean Patent Application No. 1020187003063, dated Dec. 10, 2018.
(Continued)

*Primary Examiner* — Raj Jain
(74) *Attorney, Agent, or Firm* — Harness, Dickey & Pierce, P.L.C.

(57) ABSTRACT

A wireless environment information collection system in which the wireless environment information management unit includes a unit which generates and outputs a channel measurement frame which determines the wireless stations performing stopping of communication over the first frequency channel for a fixed time, starting of measuring channel utilization of the first frequency channel, or both the stopping and the starting among the managed wireless stations, and the managed wireless stations include a unit
(Continued)

which performs, at a time designated by the channel measurement frame from the wireless environment information management unit, the stopping of the communication over the first frequency channel, the measuring of the channel utilization of the first frequency channel, or both the stopping and the measuring, and which outputs the obtained wireless environment information to the wireless environment information management unit through the wired network or the wireless network.

10 Claims, 3 Drawing Sheets

(51) Int. Cl.
*H04W 24/10* (2009.01)
*H04W 24/02* (2009.01)
*H04W 16/14* (2009.01)
*H04W 74/08* (2009.01)
*H04W 84/12* (2009.01)

(52) U.S. Cl.
CPC ....... *H04W 24/10* (2013.01); *H04W 74/0816* (2013.01); *H04W 84/12* (2013.01)

(56) References Cited

U.S. PATENT DOCUMENTS

| | | | | |
|---|---|---|---|---|
| 2012/0163279 A1* | 6/2012 | Tran | ......................... | H04Q 9/00 370/312 |
| 2013/0201857 A1* | 8/2013 | Bhargava | ............... | H04K 3/222 370/252 |
| 2013/0250834 A1* | 9/2013 | Seok | ..................... | H04W 48/16 370/311 |
| 2014/0036841 A1* | 2/2014 | Gray | ................... | H04L 63/1416 370/329 |
| 2014/0064231 A1* | 3/2014 | Park | .................... | H04W 74/002 370/329 |
| 2015/0094103 A1* | 4/2015 | Wang | .................... | H04W 4/023 455/456.6 |
| 2015/0289142 A1* | 10/2015 | Abeysekera | .......... | H04W 24/02 370/338 |
| 2017/0142017 A1* | 5/2017 | Davis | .................. | H04L 43/0882 |
| 2018/0206134 A1* | 7/2018 | Kudo | .................... | H04W 24/00 |

FOREIGN PATENT DOCUMENTS

| | | |
|---|---|---|
| JP | 2013-5313 A | 1/2013 |
| JP | 2014-17800 A | 1/2014 |
| JP | 2014-155160 A | 8/2014 |
| WO | WO-2010/079560 A1 | 7/2010 |
| WO | WO-2011/130344 A1 | 10/2011 |
| WO | WO-2011130344 A9 | 11/2012 |
| WO | WO-2015002656 A1 | 1/2015 |

OTHER PUBLICATIONS

International Preliminary Report on Patentability (Ch. I), IB, Geneva, dated Feb. 6, 2018, with English translation, incorporating the English translation of the Written Opinion of the ISA. ISA/JP. dated Sep. 20, 2016.
International Search Report for PCT/JP2016/072541, ISA/JP, Tokyo, dated Sep. 20, 2016 with English translation.
Written Opinion of the ISA for PCT/JP2016/072541, ISA/JP, Tokyo, dated Sep. 20. 2016.
Extended European Search Report in related application EP 16833002.5, ISA/EP, Munich, dated Nov. 27, 2018.
Indian Office Action from counterpart IN201817001631, dated Mar. 6, 2020.

* cited by examiner

1 : FIRST FREQUENCY CHANNEL
2 : SECOND FREQUENCY CHANNEL

WIRELESS ENVIRONMENT INFORMATION COLLECTION SYSTEM AND METHOD

CROSS-REFERENCE TO RELATED APPLICATIONS

This application is a U.S. National Stage application claiming the benefit of prior filed International Application Number PCT/JP2016/072541, filed on Aug. 1, 2016, in which the International Application claims priority from Japanese Patent Application Number 2015-154479, filed on Aug. 4, 2015, the entire contents of which are incorporated herein by reference.

TECHNICAL FIELD

The present invention relates to a wireless environment information collection system and a wireless environment information collection method that acquire wireless environment information which includes channel utilization and a wireless station ID relating to the channel utilization and estimate throughput characteristics in a network in which access control that is based on Carrier Sense Multiple Access/Collision Avoidance (CSMA/CA) is performed.

BACKGROUND ART

Wireless Local Area Network (LAN) systems that are stipulated in a standard IEEE 802.11 have been improved in throughput year after year, and have come into widespread use as one example of main wireless access (Non-Patent Document 1). Because the wireless LAN system can be used in an unlicensed band that is a frequency band that does not require a license, various types of wireless terminals have come into widespread use. Particularly, the spread of smartphones remarkably increases an opportunity to use the wireless LAN system.

Because access control that is based on a CSMA/CA scheme is performed on the wireless LAN system in a 2.4 GHz band and a 5 GHz band, a case where throughput cannot be determined in conditions such as a Signal to Noise Ratio (SNR) of a physical link occurs, such as when throughput greatly decreases due to interference caused by a communication link in the vicinity. The greater the number of nodes that performs the access control that uses the CSMA/CA scheme, the more serious a problem.

Particularly, a decrease in throughput is also due to a hidden terminal problem and an exposed terminal problem. These influences are determined by a communication situation of a wireless station in the vicinity or a condition in which wireless stations detect each other. On the other hand, an attempt is made to interpret throughput characteristics in the CSMA/CA using a contention graph in which wireless stations that possibly detect each other, which can be defined with a graph theory are linked using edges and in which a communication link that is made from wireless stations or wireless stations for transmission and reception is taken as a vertex. However, there remain serious problems with estimation for an actual system, such as when a traffic condition of a wireless station in the vicinity is always assumed to be in a saturated state, when conditions in which the wireless station is detectable with transmission and reception are the same, or when only one of the uplink and the downlink is assumed.

Non-Patent Document 1: IEEE Std 802.11ac(TM)-2013, "IEEE Standard for Information technology—Telecommunications and information exchange between systems Local and metropolitan area networks—Specific requirements, Part 11: Wireless LAN Medium Access Control (MAC) and Physical Layer (PHY) Specifications", December 2013

DISCLOSURE

Problems to be Solved

In a network in which the access control that is based on the CSMA/CA scheme is performed, in order to evaluate throughput of a certain wireless station, there is a need to determine how many wireless resources are used by many wireless stations that have a spatial relationship, which is connected with the contention graph. However, when the wireless station collects wireless environment information in a completely asynchronous manner, because loss of information due to frame collision takes place or data integrity lacks, there is a problem in that a wireless situation cannot be now precisely known.

Particularly, because of a rapid increase in traffic, in a situation where wireless resources run short, if the wireless station measures the channel utilization individually, frames that are transmitted by wireless stations that have a hidden terminal relationship overlap, and thus a preamble portion of the frame is not correctly read and the wireless station that transmits the frame cannot be specified. Furthermore, a result of the measuring depends heavily on a communication situation of the wireless station that uses a network temporarily, and a problem occurs in that the result of the measuring is hard to deal with as statistical information.

A proposition of the present invention is to provide a wireless environment information collection system and a wireless environment information collection method that are capable of reliably acquiring wireless environment information that includes channel utilization and a wireless station ID relating to the channel utilization and of estimating throughput characteristics in a wireless communication system in which wireless communication is performed using a CSMA/CA scheme.

Means for Solving the Problems

According to a first invention, there is provided a wireless environment information collection system including a plurality of wireless stations performing wireless communication using a CSMA/CA scheme over a first frequency channel, and a wireless environment information management unit collecting wireless environment information of manage wireless stations being connected through a wired network or a wireless network among the plurality of wireless stations, in which the wireless environment information management unit includes a unit which generates and outputs a channel measurement frame which determines the wireless stations performing stopping of communication over the first frequency channel for a fixed time, starting of measuring of channel utilization of the first frequency channel, or the stopping of communication and the starting of measuring among the managed wireless stations; and the managed wireless stations include a unit which performs, at a time designated by the channel measurement frame from the wireless environment information management unit, the stopping of the communication over the first frequency channel, the measuring of the channel utilization of the first frequency channel, or the stopping of the communication and the measuring of the channel utilization, and which outputs the obtained wireless environment information to the wireless environment information management unit through the wired network or the wireless network.

In the wireless environment information collection system according to the first invention, part of or all of the managed wireless stations may have a function of transferring the channel measurement frame and wireless environment information between each of the managed wireless stations using a second frequency channel.

In the wireless environment information collection system according to the first invention, the wireless environment information management unit may include a unit which generates the channel measurement frame performing the measuring of the channel utilization to be started in a fixed amount of time after the stopping of the communication over first frequency channel.

In the wireless environment information collection system according to the first invention, the managed wireless stations may include a notification unit which notifies a stop of a communication function to the wireless stations being a communication partner when the time to perform the stopping of the communication over the first frequency channel, the measuring of the channel utilization of the first frequency channel, or both the stopping of the communication and the measuring of the channel utilization is designated by the channel measurement frame from the wireless environment information management unit and when the designated time approaches.

In the wireless environment information collection system according to the first invention, the managed wireless stations may include a unit which discards, during a period of designated time, a frame received from the wireless stations being a communication partner when the time to perform the stopping of the communication over the first frequency channel, the measuring of the channel utilization of the first frequency channel, or both the stopping of the communication and the measuring of the channel utilization is designated by the channel measurement frame from the wireless environment information management unit.

In the wireless environment information collection system according to the first invention, the managed wireless stations may include a unit which measures, during a period of designated time, the channel utilization by excluding from a calculation of the channel utilization a time required to receive a frame and a time required to transmit a control signal from the wireless stations being a communication partner when the time to perform the stopping of the communication over the first frequency channel, the measuring of the channel utilization of the first frequency channel, or both the stopping of the communication and the measuring of the channel utilization is designated by the channel measurement frame from the wireless environment information management unit.

In the wireless environment information collection system according to the first invention, the managed wireless stations may include a unit which notifies a change of an association wireless terminal ID to the wireless stations when the time to perform the stopping of the communication over the first frequency channel, the measuring of the channel utilization of the first frequency channel, or both the stopping of the communication and the measuring of the channel utilization is designated by the channel measurement frame from the wireless environment information management unit and when the designated time approaches.

In the wireless environment information collection system according to the first invention, the wireless environment information management unit may include a channel measurement frame generator generating a channel measurement frame which assigns to immediately perform the stopping of the communication over the first frequency channel, the measuring of the channel utilization of the first frequency channel, or both the stopping of the communication and the measuring of the channel utilization; a database storing a delay time required for a signal to reach the managed wireless stations; and a network communication unit outputting the channel measurement frame to the managed wireless stations at a timing earlier than an amount of time which corresponds to the delay time.

In the wireless environment information collection system according to the first invention, the wireless environment information management unit may include a unit which determines a schedule for the stopping the communication over the first frequency channel, the measuring the channel utilization of the first frequency channel, or both the stopping of the communication and the measuring of the channel utilization for the managed wireless stations using the second frequency channel, and which outputs a result of the determination as the channel measurement frame.

According to a second invention, there is provided a wireless environment information collection method collecting wireless environment information of managed wireless stations including a plurality of wireless stations performing wireless communication using a CSMA/CA scheme over a first frequency channel, and a wireless environment information management unit collecting the wireless environment information of the manage wireless stations being connected through a wired network or a wireless network among the plurality of wireless stations, in which the wireless environment information management unit generates and outputs a channel measurement frame which determines the wireless stations performing stopping of communication over the first frequency channel for a fixed time, starting of measuring channel utilization of the first frequency channel, or both the stopping of communication and the starting of measuring among the managed wireless stations; and the managed wireless stations perform, at a time designated by the channel measurement frame from the wireless environment information management unit, the stopping of the communication over the first frequency channel, the measuring of the channel utilization of the first frequency channel, or both the stopping of the communication and the measuring of the channel utilization, and outputs the obtained wireless environment information to the wireless environment information management unit through the wired network or the wireless network.

Effects

According to the present invention, a wireless station that causes stopping of communication over a first frequency channel, or measuring of channel utilization of the first frequency channel, or both these operations to be performed in a managed wireless station that performs wireless communication that is based on a CSMA/CA scheme, and thus a result of the measuring of the channel utilization can be prevented from exerting an influence on a frame of the managed wireless station, a frame collision probability can be decreased, and a failure in preamble reading or mixing of pieces of data that have a low correlation in terms of time can be prevented. Accordingly, acquisition of a preamble signal indicating a wireless station that transmits an observed frame or a wireless communication system to which the wireless station belongs can be reliably performed and wireless environment information can be collected in more detail.

DETAILED DESCRIPTION OF THE EMBODIMENTS

Figure 1:
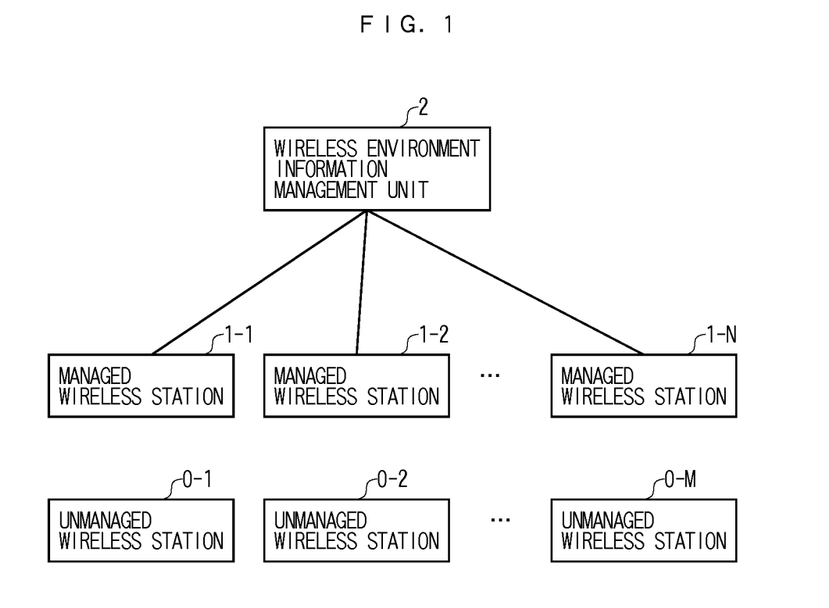
FIG. 1 is a diagram illustrating an example of a basic configuration of a wireless environment information collection system according to the present invention.

FIG. 1 illustrates an example of a basic configuration of a wireless environment information collection system according to the present invention.

In FIG. 1, wireless stations are categorized into managed wireless stations 1-1 to 1-N that are connected to a wireless environment information management unit 2 through a wired or wireless network or a wired and wireless network, and unmanaged wireless stations 0-1 to 0-M that are not connected to the wireless environment information management unit 2. Each of the managed wireless stations 1-1 to 1-N and the unmanaged wireless stations 0-1 to 0-M has one or more unique wireless stations ID and possibly performs communication using every wireless station ID. The wireless station ID is any identifiable ID among a SSID, a MAC address, and an IP address, an ID of a carrier wave generator of the wireless station, a manufacture ID of the wireless station, and the like.

At this point, the managed wireless stations 1-1 to 1-N, and the unmanaged wireless stations 0-1 to 0-M in the vicinity of the managed wireless stations 1-1 to 1-N, respectively, perform wireless communication that is based on a CSMA/CA scheme, over one or more frequency channels. Furthermore, a frequency channel over which communication is performed in compliance with the CSMA/CA scheme is defined as a first frequency channel, and a frequency channel over which the communication is performed using other schemes, for example, cellular communication is defined as a second frequency channel.

The present invention has the following feature. The wireless environment information management unit 2 individually performs stopping of communication over the first frequency channel or measuring of channel utilization of the first frequency channel, or control of both of the stopping and the measurement, on the managed wireless stations 1-1 to 1-N, thereby measuring channel utilization of the first frequency, collecting wireless environment information that includes a wireless station ID, and estimating throughput characteristics of each managed wireless station.

Figure 2:
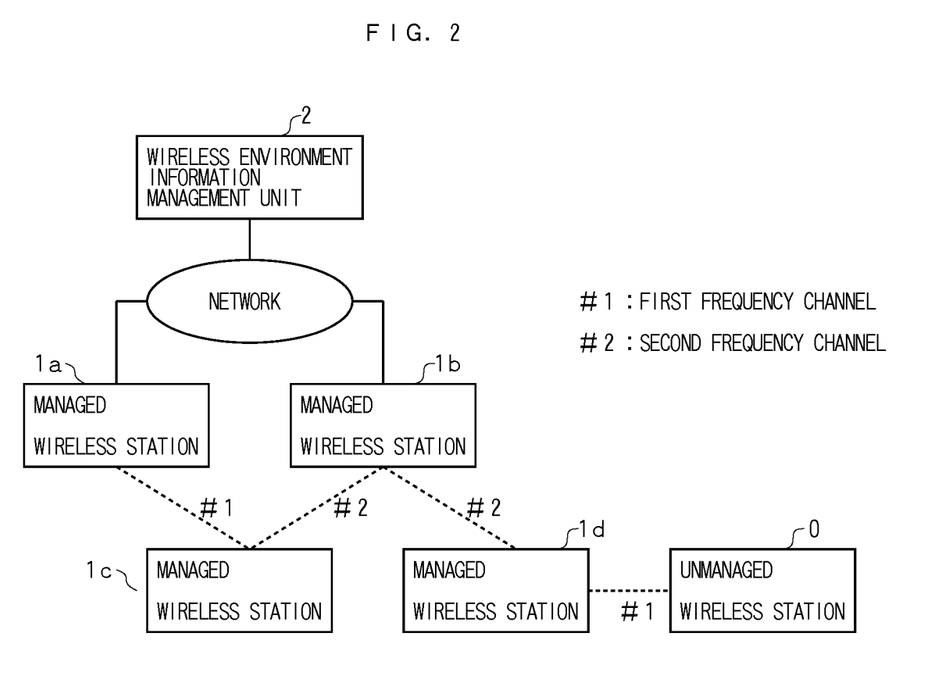
FIG. 2 is a diagram illustrating a configuration of an embodiment of the wireless environment information collection system according to the present invention.

FIG. 2 illustrates a configuration of an embodiment of the wireless environment information collection system according to the present embodiment.

In FIG. 2, the managed wireless stations (1-1 to 1-N in FIG. 1) are categorized, by a connection relationship with the wireless environment information management unit 2 or by a frequency channel that is used, into managed wireless access points 1a and 1b and managed wireless terminals 1c and 1d that belong to the managed wireless access points 1a and 1b, respectively. The managed wireless access points 1a and 1b are connected to the wireless environment information management unit 2 through a wired network. The managed wireless terminal 1c belongs to the managed wireless access point 1a and the managed wireless access point 1b, performs the wireless communication in compliance with the CSMA/CA scheme with the managed wireless access point 1a using the first frequency channel, and also possibly performs the wireless communication, which uses the cellular communication, with the managed wireless access point 1b using the second frequency channel. The managed wireless terminal 1d belongs to the managed wireless access point 1b and performs the wireless communication, which uses the cellular communication, using the second frequency channel, and also performs the wireless communication in compliance with the CSMA/CA scheme with the unmanaged wireless station 0 using the first frequency channel. Additionally, although not illustrated, the unmanaged wireless station 0 is present which performs the wireless communication in compliance with the CSMA/CA scheme using the first frequency channel without belonging to the managed wireless access points 1a and 1b.

The wireless environment information management unit 2 can collect in advance information as to whether or not the managed wireless access point 1a that is connected in a wired or wireless network and the managed wireless terminals 1c and 1d that belong to the managed wireless access points 1a and 1b, respectively, perform the communication in compliance with the CSMA/CA scheme using the first frequency channel, a bandwidth that is used for the communication, a position of the wireless station, information on the network to which the wireless station is connected, a session initiation failure on the first frequency channel, a communication abnormality, such as a decrease in throughput on the first frequency channel, and information on the throughput that is obtained by the wireless station through the communication, as pieces of wireless environment information. However, the managed wireless terminal 1c that belongs to the managed wireless access point 1a cannot of itself select a frequency channel, and because of this, can also transfer a station function, such as a selectable frequency channel or bandwidth, as the wireless environment information, to the wireless environment information management unit 2.

The wireless environment information management unit 2 may further collect connection station information on the managed wireless access point 1b that performs communication using the second frequency channel, application information of the station that is connected, traffic information on the second frequency channel, or throughput information on the second frequency channel, as the wireless environment information.

An embodiment of a method of acquiring the channel utilization in the wireless environment information management unit 2 will be described below.

First Embodiment

In a first embodiment, the managed wireless access point 1a that sets the first frequency channel to be a primary channel, or the managed wireless terminal 1c that communicates with the managed wireless access point 1a is instructed to stop frame communication at the same time, or to start to measure the channel utilization, or to perform both these operations. For example, the managed wireless terminal 1c may be instructed to stop the frame communication and the managed wireless access point 1a may be instructed to start to measure the channel utilization.

Furthermore, among wireless stations that set the first frequency channel to be the primary channel, or a group of wireless stations that have a spatial relation to each other may be selected. For example, the group of wireless stations that have the spatial relation to each other can be determined as follows.

Condition 1: A wireless station A that belongs to the group of wireless stations is a wireless station B other than the wireless station A, which belongs to the group of wireless stations, or is a wireless station C that the wireless station B possibly detects.

Condition 2: Positional information that is collected from the wireless station satisfies a certain condition.

Condition 3: The wireless station detects a wireless station ID that is determined in advance.

Condition 4: The wireless station detects the managed wireless access point 1b that uses the cellular communication which is determined in advance.

Condition 5: The wireless station is a wireless station that is determined in advance by an owner of the wireless station or a type of contract that is signed by the owner.

In the wireless environment information management unit 2, when the wireless station that performs stopping of the frame communication at the same time, or starting of the measuring of the channel utilization, or both these operations are determined, a timing or a schedule for measurement is determined. The timing for measurement is determined from the collected wireless environment information. However, for the timing for measurement, measuring time may be determined in advance such as 10:00 am, 12:00 am, 15:00 am, or 18:00 am, or time that is based on time tables for public transportation, such as a train or an airplane may be determined. When the timing is determined using the wireless environment information, for example, in the wireless station that performs the communication over the first frequency channel, the timing for measurement may be time at which the communication abnormality is reported or time that is a fixed amount of time earlier than time scheduled for the report, time at which the number of the managed wireless terminals 1c and 1d increases or time that is a fixed amount of time earlier than time scheduled for the increase, time at which the number of the managed wireless terminals 1c and 1d decreases, time at which traffic increases on the first frequency channel or time that is a fixed amount of time earlier than time scheduled for the increase, time at which the traffic decreases on the first frequency channel, and the like.

Second Embodiment

In the second embodiment, the managed access point 1a and the managed wireless terminals 1c and 1d are instructed to stop the frame transmission over the first frequency channel or to start to measure the channel utilization of the first frequency channel, or to perform both these operations. Furthermore, one or more wireless stations in which the traffic does not occur may be selected, and the channel utilization of the first frequency channel may be measured. Furthermore, in a wireless station, when a wireless station that is subject to a specific condition, or the managed wireless access point 1b that uses the second frequency channel is detected, the measuring of the first frequency channel may be performed on the wireless station.

For example, in the wireless environment information management unit 2, a case where information on the group of wireless stations that have a spatial relationship with a wireless station ID xx22 is collected is assumed. As conditions for making a determination that the wireless environment information relating to the ID xx22 is collected with high priority, for example, the following conditions are considered: an amount of traffic in the ID xx22 is large, the number of wireless stations that are connected to ID xx22 is great, an amount of traffic in the managed wireless access point 1b that uses the second frequency channel in which the ID xx22 and a cell overlap is large, a backhaul network capacity of the ID xx22 is large, a connection type of the ID xx22 is convenient for causing the traffic to flow, and so forth.

It is assumed that the wireless station ID xx22 performs the communication over the first frequency channel and that the wireless station ID xx22 detects wireless stations ID xx11 and ID xx33. In the first embodiment, the wireless environment information management unit 2 instructs the ID xx22, the ID xx11, and the ID xx33 to stop the frame transmission over the first frequency channel or to start to measure the channel utilization of the first frequency channel, or to perform both these operations. In the second embodiment, the group of wireless stations, collection from the group of wireless stations, a wireless station that uses another frequency channel, which detects the ID xx22, the ID xx11, and the ID xx33, or a wireless station which detects that the managed wireless terminals 1c and 1d which detect a new group of wireless stations are present are performed.

The wireless environment information management unit 2 checks conditions for measurable channel utilization, such as a condition in which, although the wireless station in the group of wireless stations performs the measuring of the channel utilization of the first frequency channel over which the wireless station ID xx22 performs the communication, this neither exerts any influence on user experience, not pose any problem in terms of a type of contract that is signed by an owner of the terminal wireless station, nor causes traffic on the first frequency channel to occur in a terminal wireless station, and then notifies the terminal wireless station of the measuring of the channel utilization of the first frequency channel. On this occasion, a notification signal that immediately causes the channel utilization to be measured may be transmitted, and the measurement may be performed at a specified time. Furthermore, when the channel utilization is immediately measured, a notification timing is made different for each wireless station, in such a manner that processing, such as measurement starting or communication stopping, is started at approximately the same time, considering a transfer delay between the wireless environment information management unit 2 and the wireless station that is a target which is instructed to stop the frame transmission over the first frequency channel or to start to measure the channel utilization of the first frequency channel, or to perform these both operations.

The frequency channel that is measured in the second embodiment, and the timing or the schedule for measurement are determined from the collected wireless environment information. However, for the timing for measurement, measuring time may be determined in advance such as 10:00 am, 12:00 am, 15:00 am, or 18:00 am, or time that is based on time tables for public transportation, such as a train or an airplane may be determined. When the timing is determined using the wireless environment information, for example, in the wireless station that performs the communication over the first frequency channel, the timing for measurement may be time at which the communication abnormality is reported or time that is a fixed amount of time earlier than time scheduled for the report, time at which the number of the managed wireless terminals 1c and 1d increases or time that is a fixed amount of time earlier than time scheduled for the increase, time at which the number of the managed wireless terminals 1c and 1d decreases, time at which traffic increases on the first frequency channel or time that is a fixed amount of time earlier than time scheduled for the increase, time at which the traffic decreases on the first frequency channel, and the like.

Furthermore, the timing or the schedule at which the communication stopping or the measuring of the channel utilization is performed on the first frequency channel that is determined in the second embodiment may be determined for every managed wireless access point 1b that uses the second frequency channel. The managed wireless access point 1b may store in advance a channel measurement frame for providing an instruction to stop the communication over the first frequency channel or to measure the channel utilization of the first frequency channel, and may transmit the channel measurement frame at a timing for establishing communications with the managed wireless terminals 1c and 1 d, or at a timing for transmitting a control signal.

Third Embodiment

In a third embodiment, as in the first embodiment and the second embodiment, with the channel measurement frame from the wireless environment information management unit 2, the measuring of the channel utilization is performed immediately or at a designated time. However, the third embodiment is different from the first embodiment or the second embodiment in that a channel dedicated apparatus is used. A measuring apparatus in the third embodiment is a wireless station ID that does not perform the communication at a certain time, a measuring apparatus that is capable of performing only the measuring of the frequency channel.

In the third embodiment, the wireless environment information management unit 2 may determine which the wireless station ID is caused to operate as the measuring apparatus, or may determine an area where the measuring apparatus is necessary. As the wireless station that is caused to operate as the measuring apparatus, a wireless station that has a plurality of carrier wave generators (RFs) or a wireless station that includes a RF for measuring the wireless environment information can be designated. When the wireless station that has the plurality of RFs is set to be the measuring apparatus and the RF is caused to operate, a wireless station in which the frequency with which the traffic occurs is low may be selected. The wireless station in which the frequency with which the traffic occurs is low may be determined for every time or day of the week, or every day of the month and thus may be changed. When installation of the measuring apparatus is determined, this determination may be made when a wireless station that has the capability to further perform the measuring of the channel utilization is not present for the reason that the traffic is heavy and the like, or when an amount of information in a database, which relates to a specific area or the wireless station is small. For example, the wireless station that operates as the measuring apparatus may be installed in a place where a specific wireless station ID is detectable.

Figure 3:
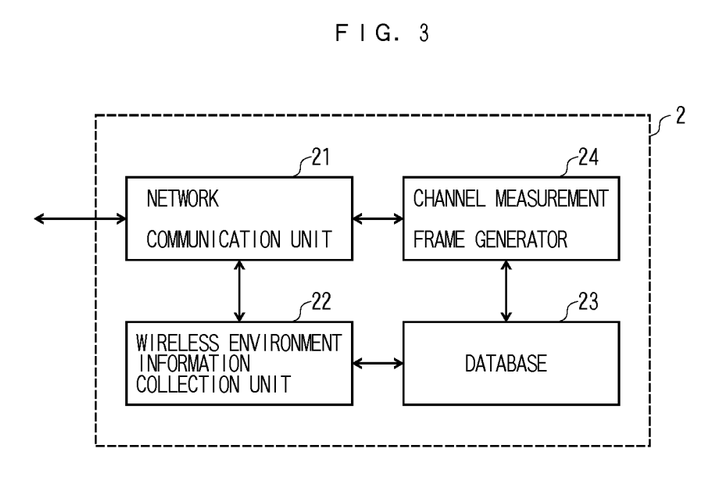
FIG. 3 is a diagram illustrating an example of a configuration of a wireless environment information management unit 2.

FIG. 3 illustrates an example of a configuration of the wireless environment information management unit 2.

In FIG. 3, the wireless environment information management unit 2 is configured with a network communication unit 21, a wireless environment information collection unit 22, a database 23, and a channel measurement frame generator 24. The wireless environment information collection unit 22 collects pieces of wireless environment information, such as the wireless station ID and the channel utilization, from the wireless station ahead of time, through the network communication unit 21 and builds the database 23. For example, the wireless station ID that is detectable for every wireless station is stored in the database. With an approach that uses a contention graph which is available in the related art, and the like, it can be determined that the channel utilization of the unmanaged wireless station, which exerts an influence on throughput characteristics in a specific wireless station ID is measured. The contention graph is a wireless station ID that has a spatial relationship as described above. The channel measurement frame generator 24 determines a plurality of wireless stations that are caused to perform the stopping of the communication over the first frequency channel for a fixed time or the starting of the measuring of the channel utilization, or both these operations, among wireless stations, and a timing for each of these operations, and generates the channel measurement frame. Furthermore, the time required for a signal to reach the wireless station may be stored in the database 23, and control that outputs the channel measurement frame at a timing that is the time corresponding to the delay time earlier may be performed.

Figure 4:
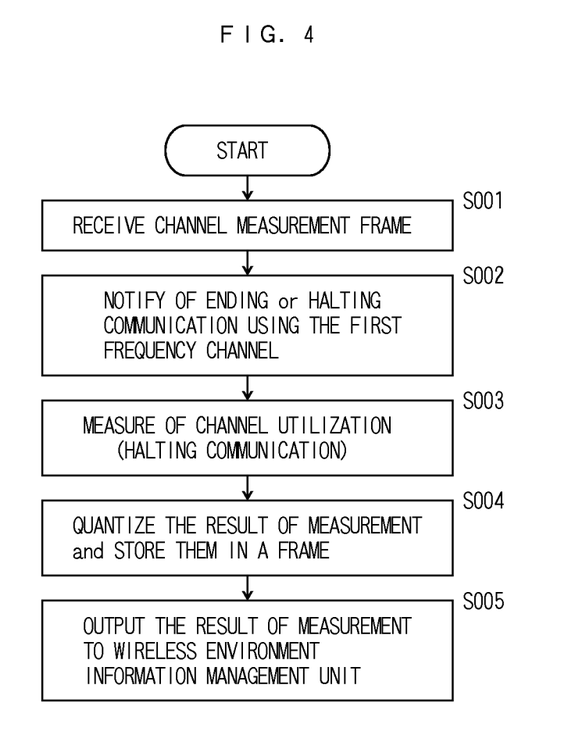
FIG. 4 is a flowchart illustrating an example of a procedure for processing for providing an instruction to measure channel information or to temporarily stop communication.

FIG. 4 illustrates an example of a procedure for processing for providing an instruction to measure the channel information or to temporarily stop the communication.

At this point, when determining the first frequency channel on which the measuring is performed, the wireless station that causes the communication over the first frequency channel to be stopped, and the wireless station that causes the measuring of the channel utilization to be performed, the wireless environment information management unit 2 outputs the channel measurement frame with the determined wireless station as a destination. At this time, a plurality of wireless stations neither necessarily need to be present, nor include the wireless station that performs the temporary stopping of the communication, but the channel measurement frame is generated in such a manner that the wireless station which performs the measuring of the channel utilization is necessarily present. The channel measurement frame is a signal for providing an instruction to temporarily stop the communication over the first frequency channel or to measure the channel utilization of the first frequency channel. The wireless environment information management unit 2 may output the channel measurement frame at a timing that is an amount of time earlier which increases in proportion to a length of latency in the wireless station, considering latency of the frame between the wireless environment information management unit 2 and the wireless station, in such a manner that a plurality of wireless stations receive the channel measurement frame and that the stopping of the designated communication or the measuring of the channel utilization is performed at approximately the same time.

In FIG. 4, when the wireless station receives the channel measurement frame (S001), according to the instruction that is provided by the channel measurement frame, the ending or the temporary stopping of the communication over the first frequency channel is notified (S002). For example, if user data is being transmitted, as soon as transmission of a frame that is being currently transmitted and replying with an ACK are finished, transmission of the next frame is awaited. Furthermore, if the user data is being received, the replying with the ACK is finished, and then a reply is stopped since reception of the next frame. When, along with the stopping of the transmission and reception, the communication with the wireless station that has the likelihood of transmitting a frame to the wireless station to which the wireless environment information management unit 2 itself belongs is performed, notification of the stopping of the communication to the wireless station, the utilization of a sleep function, or the like may be performed. Furthermore, designation may be made in such a manner that switching to communication with another wireless station ID of the wireless station to which the wireless environment information management unit 2 itself belongs takes place. Furthermore, the channel utilization may be measured without performing spontaneous communication. If all communication targets are managed wireless stations, because there is a likelihood that the notification of the stopping of the communication or the measuring of the channel utilization will come from the wireless environment information management unit 2 over the first frequency channel or the second frequency channel, high-precision measuring of the channel utilization can be realized only by imposing limitation of the spontaneous communication to each managed wireless station.

After performing necessary pre-processing such as changing of the frequency channel, the wireless station performs the measuring of the channel utilization or performs the stopping of the communication (S003). A measuring time section may also be designated by the wireless environment information management unit 2. The measuring time and the communication stopping time each are designated, a timing for starting the communication stopping is set to be earlier than the measuring time of the channel utilization, and a fixed time length is added to the timing. Thus, the wireless environment information management unit 2 can compensate for a gap in operation starting time for the wireless station due to the latency required for the channel measurement frame to arrive. For example, if it is assumed that there is a gap of 500 µs in performing the starting of the channel utilization or the stopping of the communication in the wireless station, when setting is performed in such a manner that the starting of the measuring of the channel utilization is performed 500 µs or later after the stopping the communication, a likelihood that the channel utilization will be measured during the time for which all wireless stations that receive at least the channel measurement frame stop the communication is increased.

When the measuring of the channel utilization is ended, processing, such as quantization and, if necessary, compression, is performed on the measured channel utilization, or the channel utilization and information on the wireless station ID associated with the channel utilization, and then a result of the processing is stored in a frame (S004) and is output to the wireless environment information management unit 2 using a backhaul network or a wireless network (S005).

Figure 5:
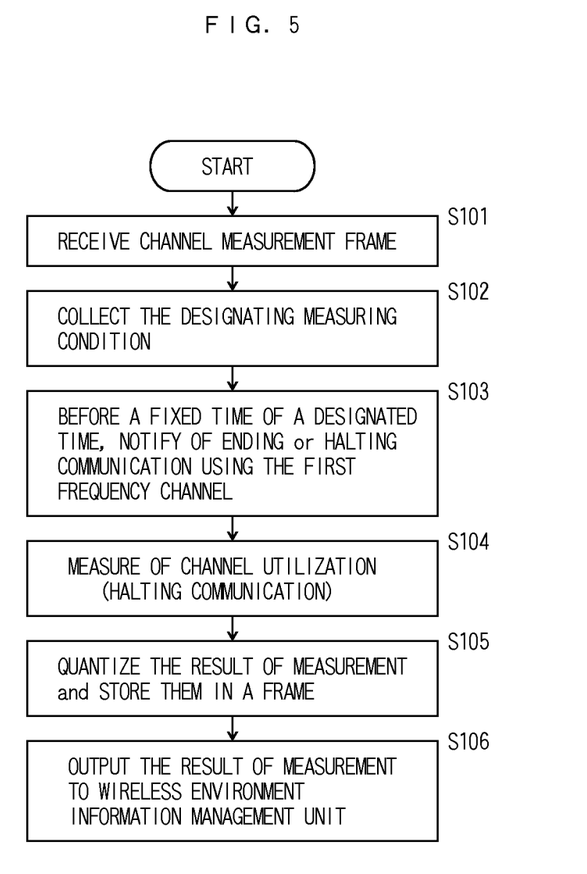
FIG. 5 is a flowchart illustrating an example of a procedure for processing for providing an instruction to designate a timing for measuring the channel information or temporarily stopping the communication.

FIG. 5 illustrates an example of a procedure for processing for providing an instruction to designate a timing for measuring the channel information or temporarily stopping the communication.

At this point, when determining the first frequency channel on which the measuring is performed, the wireless station that causes the communication over the first frequency channel to be stopped, the wireless station that causes the measuring of the channel utilization to be performed, and a timing for measuring the channel utilization, the wireless environment information management unit 2 outputs the channel measurement frame with the determined wireless station as a destination. At this time, a plurality of wireless stations neither necessarily need to be present, nor include the wireless station that performs the temporary stopping of the communication, but the channel measurement frame is generated in such a manner that the wireless station which performs the measuring of the channel utilization is necessarily present. The channel measurement frame is a signal for providing an instruction to temporarily stop the communication over the first frequency channel at a specified time or to measure the channel utilization of the first frequency channel.

In FIG. 5, when the wireless station receives the channel measurement frame (S101), a measuring condition that includes a timing for designating the channel measurement frame is acquired (S102). In addition to the timing for measuring the channel utilization, the measuring conditions are a condition as to whether a wireless station has a specific function, a condition for a state, such as mobility of the wireless station/power supply situation or mobility, network utilization conditions, and the like. The wireless environment information management unit 2 may be caused to determine whether the designated measuring condition is satisfied. When the measuring condition is satisfied and a measuring timing draws near, the ending of the communication or the temporary stopping of the communication over the first frequency channel is broadcast a fixed amount of time before a designated time (S103). In the same manner as in an example in FIG. 4, the channel utilization may be measured without performing the spontaneous communication. When a preparation is completed, at a designated timing, the measuring of the channel utilization is performed or the stopping of the communication is performed (S104). The timing for stopping the spontaneous communication over the first frequency channel or starting to measure the channel utilization of the first frequency channel may be individually designated. In the same manner as in the example in FIG. 4, the timing for starting the communication stopping is set to be earlier than the measuring time of the channel utilization, and a fixed time length is added to the timing. Thus, the wireless environment information management unit 2 can compensate for a gap in operation starting time for the wireless station due to the latency required for the channel measurement frame to arrive. When the measuring of the channel utilization is ended, processing, such as quantization and, if necessary, compression, is performed on the measured channel utilization, or the channel utilization and information on the wireless station ID associated with the channel utilization, and then a result of the processing is stored in a frame (S105) and is output to the wireless environment information management unit 2 using the backhaul network or the wireless network (S106).

Merits will be described below which results from causing the stopping of the frame transmission over the first frequency channel or the starting of the measurement of the channel utilization of the first frequency channel, or both these operations to be performed.

(First Merit)

When each managed wireless station individually performs the measuring of the channel utilization, there are a great number of managed wireless stations which perform the frame transmission thus frame collision due to the wireless stations in a mutually hidden terminal state and frame collision that results from concurrent random backoff occur frequently, a preamble signal in a frame becomes difficult to read, and there occurs a problem that a wireless station ID transmitting a frame cannot be determined. According to the present invention, a plurality of managed wireless stations are caused to stop performing the frame transmission, and thus a wireless station ID and a communication situation of the unmanaged wireless station can be known with higher precision.

(Second Merit)

Results of the measuring in every managed wireless station can be compared with each other with high precision by performing the measuring at the same time. For example, with the comparison of the results of the channel utilization, if the channel utilization that is measured in one wireless station is high in the communication between a pair of wireless stations that detect each other, there is a high likelihood that the hidden terminal problem will occur in the communication in which that wireless station is set to be the receiving side. That is, the result of the measuring of the channel utilization is easy to utilize for the determination of the hidden terminal.

(Third Merit)

Because the measuring is performed at the same point in time, management as a database is easy. Pieces of data that are collected intermittently from a wireless station at different times are difficult to associate with each other. However, if the pieces of data are pieces of information that are measured at the same time or at approximately the same time, the pieces of data can be stored in a state of being temporally associated with each other, and becomes data that is easy to use in an algorithm, such as one for machine learning.

(Fourth Merit)

In the contention graph that is obtained from the managed wireless station that has a spatial relationship, because a wireless resource usage situation of the unmanaged wireless station is acquired in a state where the traffic in the managed wireless station does not exert any influence, when traffic is imposed on the managed wireless station, it is easy to simulate what influence is exerted on the contention graph. Channel setting can be performed in such a manner that a system capacity on the managed wireless station side, or channel setting for the managed wireless station can be performed in such a manner that the contention graph showing that a specific managed wireless station to have an advantage is attained. By introducing an actual wireless resource usage situation into the contention graph, it is also possible that the wireless station ID is determined without only the detection of the wireless station exerting any influence on the surroundings.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless environment information collection system comprising:
    a plurality of wireless stations performing wireless communication using a CSMA/CA scheme over a first frequency channel; and
    a wireless environment information management unit collecting wireless environment information of managed wireless stations among the plurality of wireless stations, the managed wireless stations being connected through a wired network or a wireless network, wherein:
    the wireless environment information management unit includes a unit which generates and outputs a channel measurement frame which determines the wireless stations among the managed wireless stations, the determined wireless stations perform one of stopping of communication over the first frequency channel for a fixed time, starting of measuring channel utilization of the first frequency channel, and both the stopping of communication and the starting of measuring; and
    the managed wireless stations include a unit
        which performs, at a time designated by the channel measurement frame from the wireless environment information management unit, one of the stopping of the communication over the first frequency channel, the measuring of the channel utilization of the first frequency channel, and both the stopping of the communication and the measuring of the channel utilization,
        which obtains the wireless environment information, and
        which outputs the obtained wireless environment information to the wireless environment information management unit through the wired network or the wireless network.

2. The wireless environment information collection system according to claim 1, wherein
    part of or all of the managed wireless stations have a function of transferring the channel measurement frame and the wireless environment information between each of the managed wireless stations using a second frequency channel.

3. The wireless environment information collection system according to claim 2, wherein
    the wireless environment information management unit includes a unit
        which determines a schedule for one of the stopping the communication over the first frequency channel, the measuring the channel utilization of the first frequency channel, and both the stopping of the communication and the measuring of the channel utilization for the managed wireless stations using the second frequency channel, and
        which outputs a result of the determination as the channel measurement frame.

4. The wireless environment information collection system according to claim 1, wherein
    the wireless environment information management unit includes a unit which generates the channel measurement frame performing the measuring of the channel utilization to be started in a fixed amount of time after the stopping of the communication over the first frequency channel.

5. The wireless environment information collection system according to claim 1, wherein
    the managed wireless stations include a notification unit which notifies a stop of a communication function to the wireless stations being a communication partner when the time to perform one of the stopping of the communication over the first frequency channel, the measuring of the channel utilization of the first frequency channel, and both the stopping of the communication and the measuring of the channel utilization is designated by the channel measurement frame from the wireless environment information management unit and when the designated time approaches.

6. The wireless environment information collection system according to claim 1, wherein
the managed wireless stations include a unit which discards, during a period of designated time, a frame received from the wireless stations being a communication partner when the time to perform one of the stopping of the communication over the first frequency channel, the measuring of the channel utilization of the first frequency channel, and both the stopping of the communication and the measuring of the channel utilization is designated by the channel measurement frame from the wireless environment information management unit.

7. The wireless environment information collection system according to claim 1, wherein
the managed wireless stations include a unit which measures, during a period of designated time, the channel utilization by excluding from a calculation of the channel utilization a time required to receive a frame and a time required to transmit a control signal from the wireless stations being a communication partner when the time to perform one of the stopping of the communication over the first frequency channel, the measuring of the channel utilization of the first frequency channel, and both the stopping of the communication and the measuring of the channel utilization is designated by the channel measurement frame from the wireless environment information management unit.

8. The wireless environment information collection system according to claim 1, wherein
the managed wireless stations include a unit which notifies a change of an association wireless terminal ID to the wireless stations being a communication partner when the time to perform one of the stopping of the communication over the first frequency channel, the measuring of the channel utilization of the first frequency channel, and both the stopping of the communication and the measuring of the channel utilization is designated by the channel measurement frame from the wireless environment information management unit and when the designated time approaches.

9. The wireless environment information collection system according to claim 1, wherein
the wireless environment information management unit includes:

a channel measurement frame generator generating a channel measurement frame which assigns to immediately perform one of the stopping of the communication over the first frequency channel, the measuring of the channel utilization of the first frequency channel, and both the stopping of the communication and the measuring of the channel utilization;

a database storing a delay time required for a signal to reach the managed wireless stations; and a network communication unit outputting the channel measurement frame to the managed wireless stations at a timing earlier than an amount of time which corresponds to the delay time.

10. A wireless environment information collection method collecting wireless environment information of managed wireless stations, comprising:

a plurality of wireless stations performing wireless communication using a CSMA/CA scheme over a first frequency channel; and a wireless environment information management unit collecting the wireless environment information of the managed wireless stations among the plurality of wireless stations, the managed wireless stations being connected through a wired network or a wireless network, wherein:

the wireless environment information management unit generates and outputs a channel measurement frame which determines the wireless stations among the managed wireless stations, the determined wireless stations perform one of stopping of communication over the first frequency channel for a fixed time, starting of measuring channel utilization of the first frequency channel, and both the stopping of communication and the starting of measuring; and the managed wireless stations perform, at a time designated by the channel measurement frame from the wireless environment information management unit, one of the stopping of the communication over the first frequency channel, the measuring of the channel utilization of the first frequency channel, and both the stopping of the communication and the measuring of the channel utilization, obtains the wireless environment information, and output the obtained wireless environment information to the wireless environment information management unit through the wired network or the wireless network.

* * * * *